United States Patent [19]
McCain

[11] Patent Number: 6,113,895
[45] Date of Patent: Sep. 5, 2000

[54] ARTIFICIAL SURFACE ACTIVE LURE APPARATUS AND METHOD

[76] Inventor: J. Scott McCain, 226 S. Matthews, Bellville, Tex. 77418

[21] Appl. No.: 09/042,946

[22] Filed: Mar. 17, 1998

[51] Int. Cl.⁷ .......................... A01K 85/00; A01K 85/01
[52] U.S. Cl. .................. 424/84; 43/42.06; 43/42.53; 426/1
[58] Field of Search .............. 43/42, 42.06, 42.53, 43/17.2, 17.5, 17.6; 424/84; 426/1, 2

[56] References Cited

U.S. PATENT DOCUMENTS

| | | | |
|---|---|---|---|
| D. 346,848 | 5/1994 | Wenger | D22/126 |
| 4,267,658 | 5/1981 | Brown | 43/42.06 |
| 4,530,179 | 7/1985 | Larew | 43/42.06 |
| 4,736,542 | 4/1988 | Floyd | 43/42.06 |
| 4,887,376 | 12/1989 | Sibley et al. | 43/42.06 |
| 4,890,411 | 1/1990 | Buccilli et al. | 43/42 |
| 4,962,609 | 10/1990 | Walker | 43/42.06 |
| 4,964,235 | 10/1990 | Gruelle | 43/42.06 |
| 5,063,703 | 11/1991 | Riley | 43/42.06 |
| 5,113,606 | 5/1992 | Rinker | 43/42.19 |
| 5,170,579 | 12/1992 | Hollinger | 43/42.06 |
| 5,393,537 | 2/1995 | Rawlins | 426/1 |
| 5,505,939 | 4/1996 | Keenan | 424/84 |
| 5,517,781 | 5/1996 | Paelotta, Jr. | 43/42.06 |
| 5,664,363 | 9/1997 | Keenan | 43/42.06 |
| 6,037,039 | 3/2000 | Koike et al. | 428/195 |

*Primary Examiner*—Robert H. Harrison
*Attorney, Agent, or Firm*—J. Nevin Shaffer, Jr.; Shaffer & Culbertson, LLP

[57] ABSTRACT

An artificial surface active soft plastic lure (16) includes emulsifiers so that the plastic lure (16) reacts in the presence of water and loses a measurable portion of its mass. Fish attractants and stimulants (12) are added to the surface active soft plastic lure (16) so that as the lure (16) reacts, fish attractants and stimulants (12) are actually released into the water for sensing by fish. The emulsifiers are selected from a group of chemicals including nonionic, amphoteric, alkanolamide, sorbitan monooleates, fatty acids, sulfonates, fatty esters, phosphate esters, amines, anionic, cationic, monostearates, sorbitan tristearates, and sorbitan trioleates. Preferred fish attractants include dehydrated protein and amino acids, in particular amino acids which are water soluble and alkaline or neutral substances having a pH of approximately 7–8. In the preferred embodiments, the amino acids are selected from a group including betaine, glycine, glutamic acid, proline, taurine and valine.

20 Claims, 1 Drawing Sheet

ARTIFICIAL SURFACE ACTIVE LURE APPARATUS AND METHOD

BACKGROUND OF THE INVENTION

This invention relates to an artificial surface active lure. In particular, the invention relates to an artificial surface active lure for catching fish and, in a preferred embodiment, to an artificial surface active lure containing fish attractants and stimulants.

As the objective of fishermen has remained constant over time, the methods of accomplishing that objective have changed. The advent of the development of a soft plastic lure made from a combination of polyvinyl chloride resin, plasticizer, hydrocarbon extenders, and stabilizers has resulted in a veritable explosion of innovation as reflected in the numerous patents that have issued for the utilization of this soft plastic as a lure. In particular, the innovation has centered around methods of making the soft plastic lure more attractive to fish. In this regard, innovation has focused on how to make a plastic lure more "tasty" to fish. An example of such a lure additive patent is disclosed in Larew, U.S. Pat. No. 4,530,179, which adds salt to the liquid plastisol so that once formed and cooled, the lure body has a salty taste. When the Larew lure is submerged in water, the lure does not exude salt, and therefore retains its taste indefinitely. Similarly, Riley, U.S. Pat. No. 5,063,703, discloses blending freeze dried food and fish oil with plastic and a phosphorescent to form a plastic lure which glows and provides an odor to attract fish. In the Sibley, et al. patent, U.S. Pat. No. 4,887,376, an artificial fish lure is created out of a polymer that is hygroscopic. The polymer is mixed with fish attractants as the lure is being formed. As water is absorbed by the lure, Sibley suggests that the fish attractant is released into the water.

Other inventors have approached the problem of introducing fish attractant to the water by means of soft plastic lures in other ways. One coats the lure with a lacquer, then applies absorbent material to the lacquer, and then applies scent to the absorbent material which is presumably absorbed by the absorbent material and then released into the water (Keenan, U.S. Pat. No. 5,664,363); one creates a central fluid reservoir with a number of lateral reservoirs extending therefrom so that when a fish bites the lure, the suggested result is that scent is extruded from the central reservoir through the lateral reservoirs into the fish's mouth (Paoletta, Jr., U.S. Pat. No. 5,517,781); another attaches a separate pouch in front of the lure for containing bait fish or scented attractants so that as the lure is drawn through the water, the scented material washes over the lure (Hollinger, U.S. Pat. No. 5,170,579); others use cavities to contain scented material (Rinker, U.S. Pat. No. 5,113,606); or fibrous material attached to the lure (Walker, U.S. Pat. No. 4,962,609); or a hollow interior chamber designed to contain fish attractant through which water is forced as the lure is retrieved, forcing the lure attractant out the rear of the lure leaving a scent trail in the water (Gruelle, U.S. Pat. No. 4,964,235).

Applicant is also aware of numerous other methods that have been designed to utilize the soft plastic lure known in the art in conjunction with various fish attractants and stimulants. In one way or another, they mirror the prior art discussed above in that the soft plastic lure formula remains virtually unchanged except for the addition of various fish attractants and stimulants. While to the human olfactory system these lures have a "scent", it is now commonly accepted by researchers that fish do not "smell" as much as they taste the food they eat. In the final analysis, then, all the prior art to date has achieved is the permanent encasing of various selected "fish attractants" in plastic. That is, the soft plastic lures known in the art are not naturally surface active and do not react with water.

A drawback to the artificial soft plastic lures known in the art, therefore, is the fact that they last, essentially, forever. A further drawback is that encasing fish attractants in impervious plastic prevents the desired objective of releasing the attractant into the water, unless by pure happenstance a piece of the fish attractant happens to meet the water-lure interface. Thus, there is a need in the art for providing an artificial, commercially-producible, soft plastic lure which operates effectively to release fish attractants and stimulants into the water. It, therefore, is an object of this invention to provide an artificial surface active lure, with all the characteristics of a soft plastic lure, that reacts with water in a relatively short period of time. Additionally, it is a further object of this invention to provide an artificial surface active lure which, in the presence of water, becomes surface active and releases entrained fish attractants and stimulants to the water.

SHORT STATEMENT OF THE INVENTION

Accordingly, the artificial surface active lure of the present invention includes an artificial plastic lure shaped in a desired form and manufactured so as to react in the presence of water. Additionally, the artificial surface active lure of the present invention includes, in a preferred embodiment, fish attractants and stimulants which, as the lure reacts in the presence of water, are released into the water so as to attract fish. The method of the invention includes the steps of creating a plastic-forming mixture and adding emulsifiers to the plastic-forming mixture so as to provide a surface active plastic that reacts in the presence of water. This surface active plastic is then formed into a lure shape for use as is known in the art. In a preferred embodiment, the emulsifiers are selected from a group of chemicals including nonionic, amphoteric, alkanolamide, sorbitan monooleates, fatty acids, sulfonates, fatty esters, phosphate esters, amines, anionic, cationic, monostearates, sorbitan tristearates, and sorbitan trioleates.

In a preferred embodiment, fish attractants and stimulants are added to the plastic-forming mixture. Preferred fish attractants and stimulants include amino acids selected from a group including betaine, glycine, glutamic acid, proline, taurine and valine, and amino acids which are water soluble and alkaline or neutral substances having a pH of approximately 7–8. Still further in a preferred embodiment, dehydrated protein is added, as well, as a fish attractant and stimulant.

BRIEF DESCRIPTION OF THE DRAWINGS

Other objects, features and advantages of the present invention will become more fully apparent from the following detailed description of the preferred embodiment, the appended claims and the accompanying drawings in which:

DETAILED DESCRIPTION OF THE PREFERRED EMBODIMENT

Figure 1:
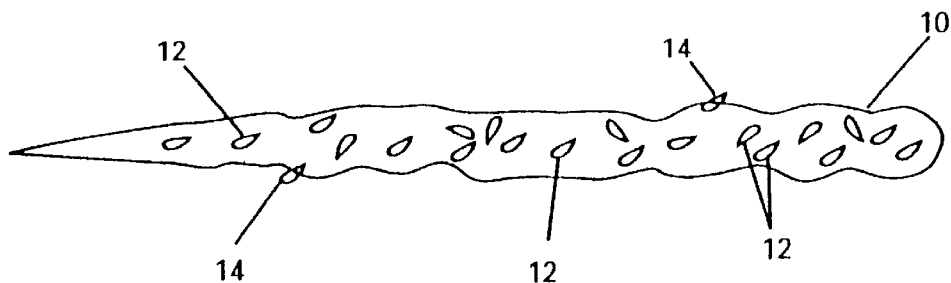
FIG. 1 is a plan view of a PRIOR ART, soft plastic lure with fish attractants and stimulants encased therein.
Figure 2:
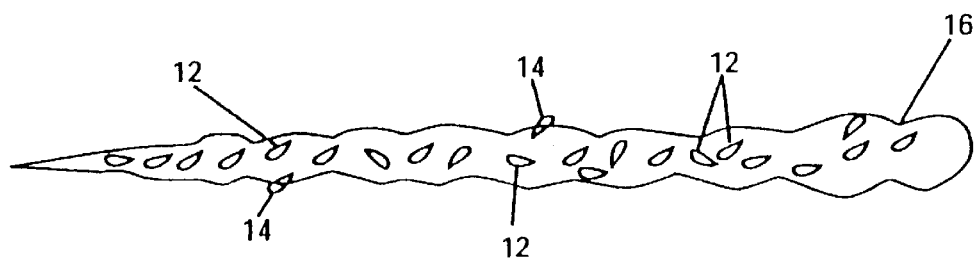
FIG. 2 is a plan view of a preferred embodiment of the artificial surface active lure of the present invention containing fish attractants and stimulants as the lure is initially introduced to water.
Figure 3:
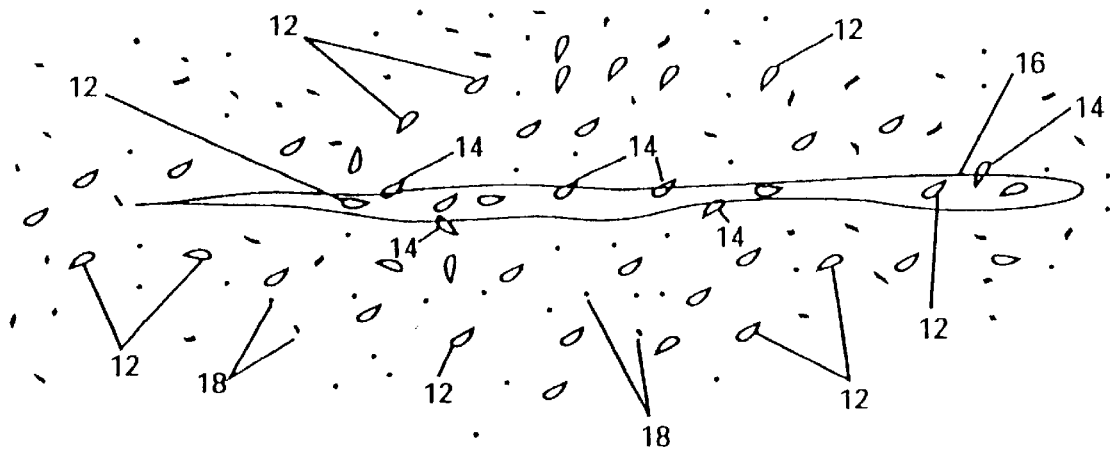
FIG. 3 is a plan view of the invention in FIG. 2 after the lure has been exposed to water for some time showing that not only has the plastic itself reacted with water and lost mass but the fish attractants and stimulants have actually been released from the lure into the water.

The preferred embodiment of the present invention is illustrated by way of example in FIGS. 2–3. With specific reference to FIG. 1, the prior art is illustrated consisting of a soft plastic lure 10 containing some sort of fish attractant/stimulant 12. As may occur in the process of manufacture by happenstance, sometimes some bits of fish attractant/stimulant 12 are only partially encapsulated within soft plastic lure 10 and protrude therefrom as bits of fish attractant/stimulant 14 which are exposed to the environment outside of soft plastic lure 10.

The chemistry required to produce plastisols used in the manufacture of soft plastic fishing lures 10 is commonly known. It consists primarily of polyvinylchloride resin disbursed in a plasticizer. Typical plasticizers are diesters such as dioctylphthalate and other alcohol diesters having varying numbers of carbon atoms. Other hydrocarbon solvents occasionally are used as secondary plasticizers or extenders. These plastisols are stabilized with metallic salts and epoxidized soya. These are used to protect against heat and light degradation.

A typical prior art plastisol formula is as follows:
15–20 percent vinyl resin;
50–60 percent plasticizer;
0.5–3 percent stabilizer;
15–25 percent hydrocarbon extender; and
1–5 percent pigments.

This formula produces a soft, pliable plastic lure suitable for the market.

The prior art includes numerous soft plastic lures which have been manufactured and marketed containing all types of organic material, oils, salt, amino acids and various other ingredients believed to attract fish. The problem, as previously pointed out, with this prior art approach is that the various attractants 12 simply become encapsulated in the plastic mixture of the soft plastic lure 10 and cannot be released into the water and detected by the fish. Except for the haphazard exposed fish attractant/stimulant 14 that occurs now and then, none of the fish attractant/stimulant 12 is ever exposed to the fish since the plastic fully and completely and forever encapsulates it. While the prior art products may smell to humans, because of the things encapsulated within the plastic, the prior art fish attractants/stimulants 12 are not released to the water to be tasted by fish.

Referring now to FIG. 2, applicant's surface active soft plastic lure 16 is shown encapsulating fish attractant/stimulant 12 and including some exposed fish attractant/stimulant 14. At the instant applicant's surface active soft plastic lure 16 is introduced to water, there is no appreciable difference between it and soft plastic lure 10. However, referring now to FIG. 3, over a short period of time, applicant's surface active soft plastic lure 16 begins to dissolve. As surface active soft plastic lure 16 dissolves, it releases fish attractant/stimulant 12 to the water so that fish sense its presence by tasting it in the water. Additionally, a milky cloudy substance 18 is produced. Milky cloudy substance 18 is a product of the reaction of surface active soft plastic lure 16 and is non-toxic and environmentally safe.

It should be understood that applicant's invention is illustrated by FIGS. 2 and 3 even without fish attractant/stimulant 12 in that the soft plastic lure 16 is surface active and loses a measurable amount of mass when exposed to water, as illustrated in FIG. 3, with or without fish attractant/stimulant 12.

The formula for the surface active soft plastic lure 16 of applicant's invention includes the addition of hydrophilic and lipophilic surface active agents. These agents are from a group of chemicals comprised of nonionic, amphoteric, alkanolamide, sorbitan monooleates, fatty acids, sulfonates, fatty esters, phosphate esters, amines, anionic, cationic, monostearates, sorbitan tristearates, and sorbitan trioleates. From this group, an agent or agents is selected that is 100 percent active, moisture-free, and has a boiling point of greater than 350° F.

These agents are commonly referred to in the industry as emulsifiers. Emulsifiers are surface-active agents which reduce interfacial tension between a liquid and a liquid or a liquid and a solid, such as in this case, water and the soft plastic lure.

Applicant has determined that when the prior art formula is modified with the addition of approximately 20–40 percent emulsifier, it produces a finished product that reacts with water causing the surface of the lure to emulsify to a slimy, murky white liquid 18. This liquid 18 releases the previously encapsulated fish attractant/stimulant 12 from the lure 16 and disperses it in a cloudy, water-soluble mixture 18. By tests, applicant has determined that when applicant's surface active soft plastic lure 16 produced from the above-described formula is placed in clear water, the water becomes cloudy.

Applicant has determined that the preferred emulsifiers are linear alcohol ethoxylates and sorbitan monooleates. The preferred ethoxylates/monooleates have a combined hydrophile/lipophile balance of 10–10.7 and a molecular weight of 355, a specific gravity of 0.849, and a pH of 6.5–7, in the presence of $C_{12}$–$C_{13}$ and $C_{14}$–$C_{15}$ carbon chains.

A number of experiments were run to determine that the reaction of applicant's surface active soft plastic lure 16 resulted in a measurable loss of lure weight while in contact with water.

EXPERIMENT #1

Fifty, 4-inch, surface active soft plastic lures were produced using the following formula; 12 percent pvc resin, 40 percent dioctylphthalate, 12 percent hydrocarbon extender, 0.3 percent epoxidized soya, 0.3 BaZn, 30.4 percent alcohol ethoxylate, and 5 percent dehydrated protein, amino acid, and fish oil extract.

Each lure was weighed and found to have an average weight of four grams. Each lure was placed in 50 milliliters of water with a pH of 6.5. The lures were tested at five temperature levels: 55° F., 65° F., 75° F., and 85° F. Each lure was tested for 15, 30, 45 minutes, respectively. Also, each lure was tested for twenty-four hours at 65° F. Weights were checked before and after each immersion. Each lure was allowed to dry after each test.

Data/Experiment #1

50 mL Water/55° F./pH 6.5

| Lure # | Original Weight (grams) | 15 minute weight | 30 minute weight | 45 minute weight | Average Loss % | pH |
|---|---|---|---|---|---|---|
| 1 | 3.5 | 3.37 | 3.04 | 2.91 | 11.24 | 7.15 |
| 2 | 4.2 | 4.04 | 3.65 | 3.49 | 11.27 | 7.36 |
| 3 | 4.0 | 3.85 | 3.48 | 3.33 | 11.17 | 7.10 |
| 4 | 3.6 | 3.47 | 3.13 | 2.99 | 11.20 | 7.11 |
| 5 | 3.8 | 3.66 | 3.30 | 3.16 | 11.23 | 7.13 |
| 6 | 4.4 | 4.24 | 3.82 | 3.66 | 11.21 | 7.14 |
| 7 | 4.0 | 3.85 | 3.48 | 3.33 | 11.17 | 7.10 |
| 8 | 3.9 | 3.75 | 3.39 | 3.24 | 11.28 | 7.40 |
| 9 | 4.0 | 3.85 | 3.48 | 3.33 | 11.17 | 7.11 |
| 10 | 4.6 | 4.43 | 4.00 | 3.82 | 11.23 | 7.15 |

Note:
pH is an important consideration due to the physical characteristics of the prey on which carnivorous fish feed.

Data/Experiment #2

50 mL Water/65° F./pH 6.5

Average Weight Lost=11.81%

Data/Experiment #3

50 mL Water/75° F./pH 6.5

Average Weight Lost=12.52%

Data/Experiment #4

50 mL Water/85° F./pH 6.5

Average Weight Lost=12.69%

Data/Experiment #5

50 mL Water/95° F./pH 6.5

Average Weight Lost=12.86%

The summary of the data provided by Experiments 1–5 are as follows:

1. The surface active soft plastic lure 16 reacts when in contact with water.
2. This reaction stops when surface active soft plastic lure 16 is removed from water and allowed to dry.
3. The surface active soft plastic lure 16 reacts again when reintroduced to water.
4. The surface active soft plastic lure 16 releases a measurable amount of its mass while in contact with water.
5. This measurable amount increases when the temperature is elevated from 55° F. to 85° F.
6. The pH of the 50 mL of water changes after the reaction occurs.
7. The specific gravity of the 50 mL of water changes after reaction occurs, indicating the release of lure mass which is further demonstrated by way of Experiment #6, hereafter.

EXPERIMENT #6

In Experiment #6, ten lures were created by applicant's surface active formula, as disclosed above, and introduced to 50 mL of water at 65° F. with a pH of 6.5 for twenty-four hours. The data for Experiment #6 is as follows:

Data/Experiment #6

50 mL Water/65° F./pH 6.5/24 hrs.

| Lure # | Original Weight (grams) | weight after 24 hours | % weight loss | specific gravity | pH |
|---|---|---|---|---|---|
| 1 | 3.7 | 2.47 | 33.24 | .816 | 7.33 |
| 2 | 4.1 | 2.74 | 33.17 | .815 | 7.25 |
| 3 | 4.0 | 2.68 | 33.00 | .816 | 7.20 |
| 4 | 3.9 | 2.61 | 33.08 | .816 | 7.22 |
| 5 | 3.5 | 2.34 | 33.14 | .810 | 7.24 |
| 6 | 4.3 | 2.87 | 33.26 | .814 | 8.20 |
| 7 | 4.5 | 3.01 | 33.11 | .813 | 7.23 |
| 8 | 4.0 | 2.68 | 33.00 | .816 | 7.20 |
| 9 | 3.6 | 2.41 | 33.06 | .816 | 7.22 |
| 10 | 4.4 | 2.94 | 33.18 | .814 | 7.31 |

This data supports a loss of approximately 33.12 percent of the lure's total weight after twenty-four hours. Specific gravity was checked to verify loss of lure mass. This data confirms the measurable loss of a portion of lure mass. Further, the water used in this twenty-four hour test had a constant specific gravity of 0.831. The data indicates that the average specific gravity of the water after testing was 0.815. This lower specific gravity indicates that the lure's loss lowered the specific gravity of the water which is consistent with the fact that the combined ingredients of applicant's formula have a specific gravity less than water.

Experiments 1–6 demonstrate that applicant's invention results in a surface active soft plastic lure 16 which loses approximately one-third of its mass when immersed in water for a period of twenty-four hours. This fact alone represents a significant advance in the art by the creation of a surface active soft plastic lure.

In addition, in a preferred embodiment, applicant's invention includes the addition of fish attractants/stimulants 12. Applicant has come to understand that feeding is an elective process with the animal selecting specific food items from a variety of nutrient sources within its environment. This selection is governed by two separate factors: chemical constituents of the food item and the animal's own chemosensitivity to those constituents. Fish detect food by a variety of sensory mechanisms, such as vision and olfaction, but taste generally plays a key role in determining whether a potential food item is swallowed or rejected. The taste system of carnivorous fish appear to be well-tuned for the detection and ingestion of edible animal tissue.

Previous investigation by others into the chemical nature of feeding stimulants for carnivorous fish have demonstrated that amino acids play a fundamental role. It has been previously demonstrated by others that, for carnivorous fish, the stimulatory efficiency of an amino acid appears to be correlated with its relative abundance within the food chain. Therefore, this specificity of stimulatory activity, applicant has determined, may be used to manufacture an artificial surface active lure 16 with stimulatory benefits. The amino acids which exhibit responses in carnivorous fish are at least betaine, glycine, glutamic acid, proline, taurine, and valine. These amino acids are water-soluble and alkaline or neutral substances having a pH of 7–8. Applicant selected chrystaline glutamic acid and glycine for a preferred embodiment of his invention. They were chosen because they are readily available, inexpensive, and they are known to enhance feeding activity in carnivorous fish. Applicant created molded, surface active soft plastic lures 16 with fish attractants/stimulants in accordance with the following formula:

> 12 percent pvc resin;
>
> 40 percent plasticizer;
>
> 0.6 percent stabilizers (epoxidized soya);
>
> 32 percent alcohol ethoxylate/monooleatic fatty acid blend;
>
> 5 percent fish oil extract/dehydrated protein;
>
> 0.75 percent glutamic acid;
>
> 2 percent glycine;
>
> 2 percent pigment (black);

and

> 5.65 percent hydrocarbon extender.

(Applicant has determined that useful artificial surface active lures 16 with fish attractant/stimulant 12 can be created from the combination of the following ingredients within the following ranges: 12–19 percent polyvinylchloride resin; 30–45 percent plasticizer; 0.2–3 percent stabilizers; 20–40 percent alcohol ethoxylate/monooleatic fatty acid blend; 3–15 percent dehydrated protein; 0.5–2 percent glutamic acid; 0.5–5 percent glycine; 0.2–5 percent pigment and optical enhancers; and 5–15% hydrocarbon extender.)

The molded parts were formed as 4½" long surface active soft plastic worm lures 16 and were pigmented black. Color was not considered due to the nature of the test. For the same reason, neither were optical enhancers used such as metallic flakes, or the like.

Using these molded surface active lures 16, tests were conducted to determine fish-catching characteristics. These lures 16 were tested in typical fishing procedures, casting and retrieval, and lures suspended from a float and trot line. Tests revealed substantial increases in catch when compared against conventional prior art plastic lures. Over a thirty-six month test period, increases from thirty to forty percent were common. Applicant's surface active lures 16 with fish attractants/stimulants 12 were tested in various lakes and ponds under all types of conditions. The most significant data was generated when applicant's lures 16 were tested against live bait.

Applicant's lures 16 were fished on trot line and suspended below a float. The trot line was baited with commercially available live bait (i.e. minnows) and applicant's surface active soft plastic lure 16 with fish attractants/stimulants 12. Tests show that fish were caught on both live bait and applicant's lure 16 with similar results. These results were duplicated in fourteen tests over a thirty-six month period showing no distinguishable preference by fish for live bait over applicant's lure 16. In the tests, one hundred forty lures 16 were prepared as described above for use in the test. Test results show that seventy-eight total fish were caught—forty on live bait and thirty-eight on applicant's surface active lure 16 with fish attractants/stimulants 12. The species of fish caught were bream, crappie, bass, and catfish.

These tests demonstrate that fish preferred applicant's surface active lure 16 with fish attractants/stimulants 12 to prior art plastic lures and showed virtually no preference to live bait when compared to applicant's surface active lure 16 with fish attractants/stimulants 12. Ingredients used in this invention are all commercially available from commonly known sources.

While the artificial surface active soft plastic lure 16 of the present invention has been disclosed in connection with the addition of emulsifiers to a plastic-forming mixture prior to forming the lure, it should also be appreciated that prior art plastic lures could be formed first, as known in the art, and then be coated with applicant's emulsifier and/or emulsifier and fish attractants/stimulants. In other words, it is envisioned that a mixture of emulsifiers sufficiently adhesive can be developed to coat existing prior art plastic lures to more or less temporarily make soft plastic lures 16 that behave as described above. Additionally, when such an emulsifier is mixed with fish attractants/stimulants 12 as disclosed, a temporary surface active soft plastic lure 16 would result. Certainly, the efficiency of this temporary surface active lure 16 is not preferred to the long-acting surface active soft plastic lure 16 of the preferred embodiment, but would still represent an advance over prior art lures 10.

Additionally, it should be understood that the method of forming soft plastic lure 16 is immaterial to the invention in that any known method of lure formation, such as, for example, injection molding and/or hand pouring, is encompassed herein.

While the present invention has been disclosed in connection with the preferred embodiment thereof, it further should be understood that there may be other embodiments which fall within the spirit and scope of the invention as defined by the following claims.

What is claimed is:

1. An artificial surface active lure method comprising the steps of:
   (a) creating a soft plastic mixture;
   (b) adding emulsifiers to said soft plastic mixture so as to provide a surface active soft plastic that starts dissolving in the presence of water so as to lose mass while in water; and
   (c) forming said surface active soft plastic mixture into a lure shape.

2. The method of claim 1 wherein the step of adding emulsifiers to said soft plastic mixture so as to provide a surface active soft plastic that starts dissolving in the presence of water further comprises the step of adding emulsifiers so that the surface active soft plastic loses a measurable portion of its mass when in contact with water.

3. The method of claim 1 wherein the step of adding emulsifiers to said soft plastic mixture further comprises adding emulsifiers so that said surface active soft plastic stops dissolving when the surface active soft plastic is removed from water.

4. The method according to claim 1, step (b) wherein said emulsifiers are selected from the group consisting of: nonionic, amphoteric, alkanolamide, sorbitan monooleates, fatty acids, sulfonates, fatty esters, phosphate esters, amines, anionic, cationic, monostearates, sorbitan tristearates, and sorbitan trioleates.

5. The method of claim 4 further comprising the step of selecting from the group of chemicals a chemical that is 100% active, moisture free, and has a boiling point of greater than 350° F.

6. The method of claim 1 wherein the step of adding emulsifiers to said soft plastic mixture so as to provide a surface active soft plastic further comprises the step of adding emulsifiers in the amount of 20 to 40 percent of said soft plastic mixture.

7. The method of claim 1 wherein the step of adding emulsifiers to said soft plastic mixture further comprises the step of adding emulsifiers that cause the surface of the lure to dissolve into a cloudy white liquid in the presence of water.

8. The method according to claim 1, step (b) wherein said emulsifiers are selected from the group of linear alcohol ethoxylate/monooleates with a combined hydrophile, lipophile balance of 10–10.7; a molecular weight of approximately 355; a specific gravity of approximately 0.849; a pH of approximately 6.5 to 7 and which have $C_{12}/C_{13}$ and $C_{14}/C_{15}$ carbon chains present.

9. The method according to claim 1, step (c) wherein said forming is selected from the group consisting of injection molding and hand pouring.

10. An artificial surface active lure method comprising the steps of:
    (a) creating a plastic mixture;
    (b) forming said plastic mixture into a lure shape; and
    (c) coating said lure shape with emulsifiers that dissolve in the presence of water.

11. An artificial fish attractant and stimulant releasing lure comprising an artificial surface active lure, containing fish attractants and stimulants, that dissolves in the presence of water so that the fish attractants and stimulants are released when the lure is introduced to water.

12. An artificial surface active fish attractant and stimulant releasing lure method comprising the steps of:
    (a) creating a plastic mixture;
    (b) adding emulsifiers to said plastic mixture so as to provide a surface active plastic that dissolves in the presence of water so as to lose mass while in the presence of water;
    (c) adding fish attractants and stimulants to said plastic mixture; and
    (d) forming said surface active plastic mixture with fish attractants and stimulants into a lure shape.

13. The method of claim 12 wherein the step of adding fish attractants and stimulants includes the step of adding amino acids.

14. The method of claim 13 wherein the step of adding amino acids further comprises the step of adding amino acids which are water soluble and alkaline or neutral substances having a pH of approximately 7–8.

15. The method of claim 13 wherein said amino acids are selected from the group consisting of betaine, glycine, glutamic acid, proline, taurine and valine.

16. The method of claim 12 wherein the step of adding fish attractants and stimulants includes the step of adding dehydrated protein.

17. The method of claim 12 wherein the step of forming said surface active plastic mixture with fish attractants and stimulants into a lure shape comprises forming by means of one of the group including injection molding and hand pouring.

18. An artificial surface active fish attractant and stimulant lure comprised of a lure formed from the combination of the following ingredients:
    12–19% polyvinylchloride resin;
    30–45% plasticizer;
    0.2–3% stabilizers;
    20–40% alcohol ethoxylate/monooleatic fatty acid blend;
    3–15% dehydrated proteins;
    0.5–2% glutamic acid;
    0.5–5% glycine;
    0.2–5% pigment and optical enhancers; and
    5–15% hydrocarbon extender.

19. An artificial surface active fish attractant and stimulant lure comprised of a lure formed from the combination of the following ingredients:

12% polyvinylchloride resin;
    40% plasticizer;
    0.6% stabilizers;
    32% alcohol ethoxylate/monooleatic fatty acid blend;
    5% dehydrated proteins;
    0.75% glutamic acid;
    2% glycine;
    2% pigment and optical enhancers; and
    5.65% hydrocarbon extender.

20. An artificial surface active fish attractant and stimulant releasing lure method comprising the steps of:
    (a) creating a plastic mixture;
    (b) forming said plastic mixture into a lure shape;
    (c) combining emulsifiers that dissolve in the presence of water with fish attractants and stimulants; and
    (d) coating the plastic lure shape with said combination of emulsifiers and fish attractants and stimulants.

* * * * *